United States Patent [19]
Caldwell

[11] Patent Number: 4,823,969
[45] Date of Patent: Apr. 25, 1989

[54] CARBONATION CAP

[76] Inventor: Michael C. Caldwell, P.O. Box 144846, Miami, Fla. 33134-4846

[21] Appl. No.: 151,294

[22] Filed: Feb. 1, 1988

[51] Int. Cl.$^4$ .............................................. B65D 51/16
[52] U.S. Cl. ................................... 215/260; 220/206; 220/209
[58] Field of Search ............... 215/260, 270; 220/209, 220/206, 208; 426/8, 118

[56] References Cited

U.S. PATENT DOCUMENTS

| | | | |
|---|---|---|---|
| 2,347,150 | 4/1944 | Consolazio | 215/260 X |
| 2,694,641 | 11/1954 | Atwood et al. | 426/8 |
| 3,374,805 | 3/1968 | Trevarrow | 220/206 X |
| 3,628,704 | 12/1971 | Corsette | 215/260 X |
| 3,913,781 | 10/1975 | Andreux | 215/260 X |
| 4,549,565 | 10/1985 | Short | 220/209 X |

FOREIGN PATENT DOCUMENTS 58-9027  2/1959  Italy ................................... 215/260

Primary Examiner—Donald F. Norton
Attorney, Agent, or Firm—Clifton T. Hunt

[57] ABSTRACT

A carbonation cap is provided for use with a conventional screw top bottle having an externally threaded neck. The carbonation cap is correspondingly internally threaded and includes one or more resilient seals which collectively function as check valves, pressure relief valves, and flow seals to enable the fermentation and carbonation of beer without transferring the beer from the bottle in which it was brewed. The resilient seals also enable the carbonation of soft drinks, or beer, from an external source of pressurized carbon dioxide. All of the foregoing is accomplished without at any time exposing the beverage or its components to the deleterious effects of the oxygen in the atmosphere.

5 Claims, 4 Drawing Sheets

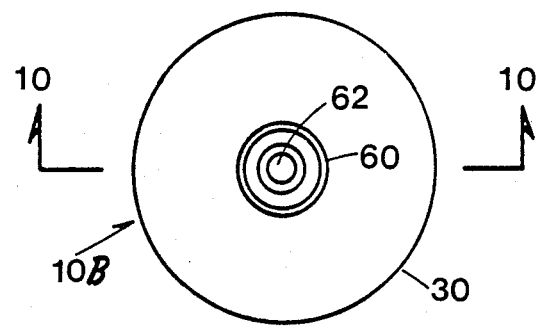
FIG 9
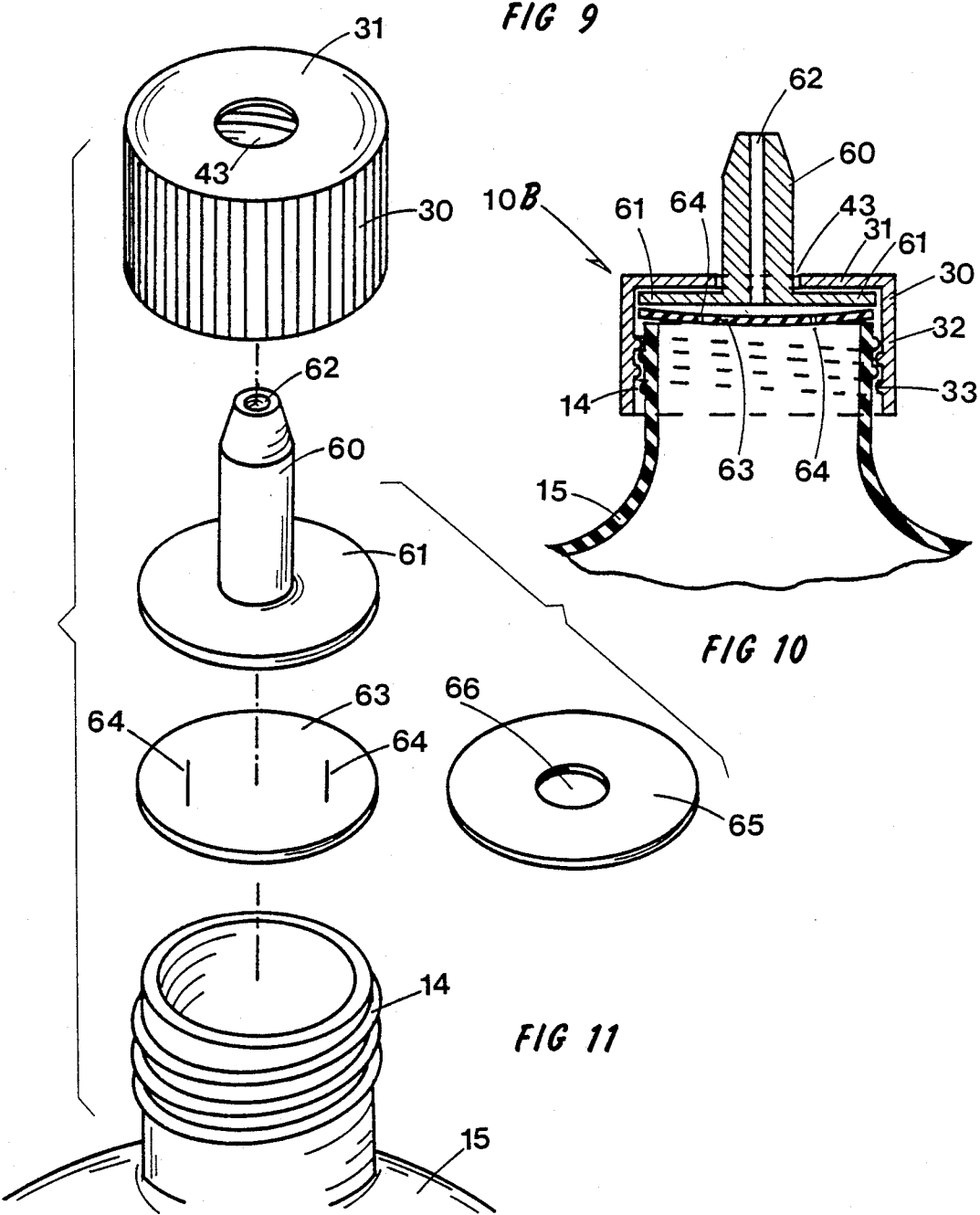
FIG 10
FIG 11

CARBONATION CAP

FIELD OF THE INVENTION

This invention relates to the home or domestic carbonation of beverages.

BACKGROUND OF THE INVENTION

The domestic production of beer is an old art, dating back many years. Historically, such beer has been brewed in a large container such as a tub or keg and then transferred to bottles and capped for storage until used.

It has been long recognized that oxygen is an enemy of beer. The fermentation of beer in an open container generates a blanket of carbon dioxide which covers the surface of the fermenting brew and protects the underlying liquid from the oxygen in the ambient atmosphere. The protective layer of $CO_2$ is helpful in protecting freshly brewed beer during the bottling process, but it is important that the bottling be carried out promptly to minimize the risk of contamination because of the evaporation of the protective $CO_2$ blanket.

My earlier Pat. No. 4,676,283 recognizes the difficulty of keeping the oxygen out of the beer while transferring freshly brewed beer from a large container into individual bottles, and discloses apparatus for making beer by transferring either the pressurized $CO_2$ or the liquid from one container into a storage bottle without at any time exposing either the $CO_2$ or the liquid to the atmosphere. The troublesome bottling step and the expensive capping operation were thereby eliminated. The system is effective but the apparatus is expensive.

SUMMARY OF THE INVENTION

The carbonation cap of the present invention enables the carbonation of a beverage in the storage bottle and thereby eliminates the need for transfer, bottling, priming, and capping the beverage.

One embodiment of the carbonation cap includes a pressure relief valve, a funnel, and an outlet to receive the sediment remaining after the carbonation of beer and the inversion of the bottle. The beer can be fermented and carbonated in its storage bottle, the bottle inverted and the sedimentary yeast removed. The bottle is then positioned for storage, all without exposing the beer to the atmosphere.

A second embodiment of the carbonation cap acts as an inlet for pressurized $CO_2$ and as a pressure relief cap to vent excess $CO_2$ from the container, thereby producing a constant carbonation pressure which may be regulated by controlling the temperature of the liquid.

A third embodiment of the carbonation cap selectively acts as a check seal to maintain carbonating pressure or a flow seal to transfer pressurized $CO_2$ or liquid between bottles.

BRIEF DESCRIPTION OF THE DRAWINGS

FIG. 9 is a top plan view of a third embodiment of the invention;

FIG. 10 is a sectional view taken substantially along the line 10—10 in FIG. 9; and FIG. 11 is an exploded view of the carbonation cap shown in FIG. 9 and illustrating a check seal above the container and a flow seal on the right side of the drawing, the check seal to be used to allow the inlet of pressurized $CO_2$ and for maintaining pressure in the container, and the flow seal to be used instead of the check seal during the transfer of pressurized $CO_2$ or liquid to or from the container.

DETAILED DESCRIPTION OF THE INVENTION

Figure 5:
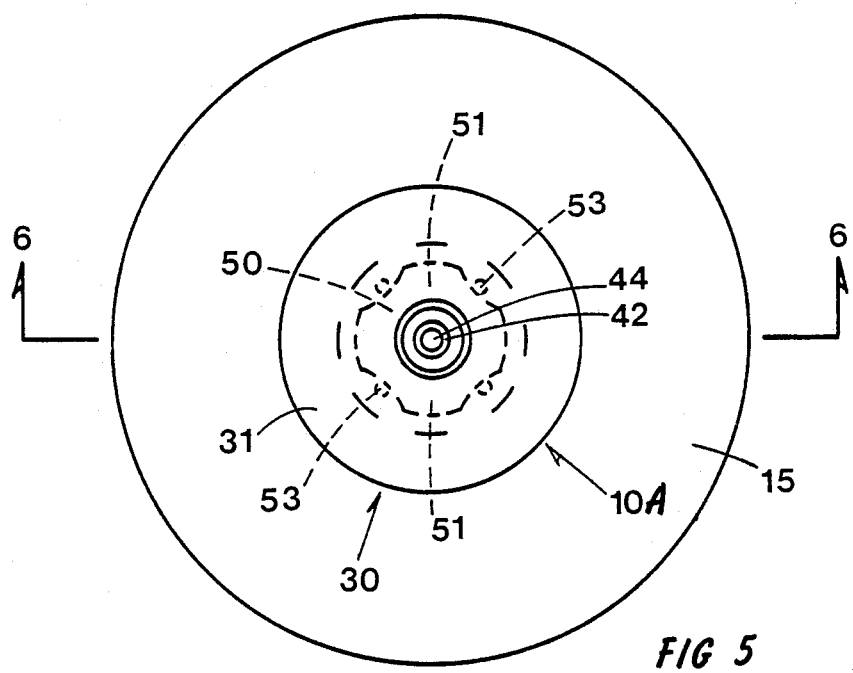
FIG. 5 is a top plan view of a second embodiment of the carbonation cap.
Figure 6:
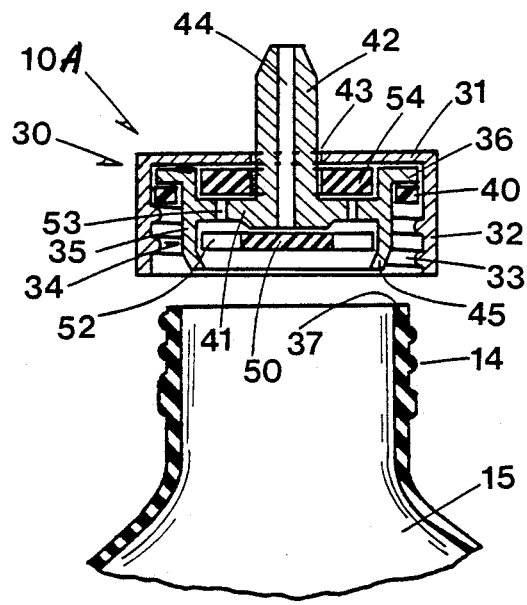
FIG. 6 is a sectional view taken substantially along the line 6—6 in FIG. 5 and partially exploded for purposes of illustration.
Figures 7, 8:
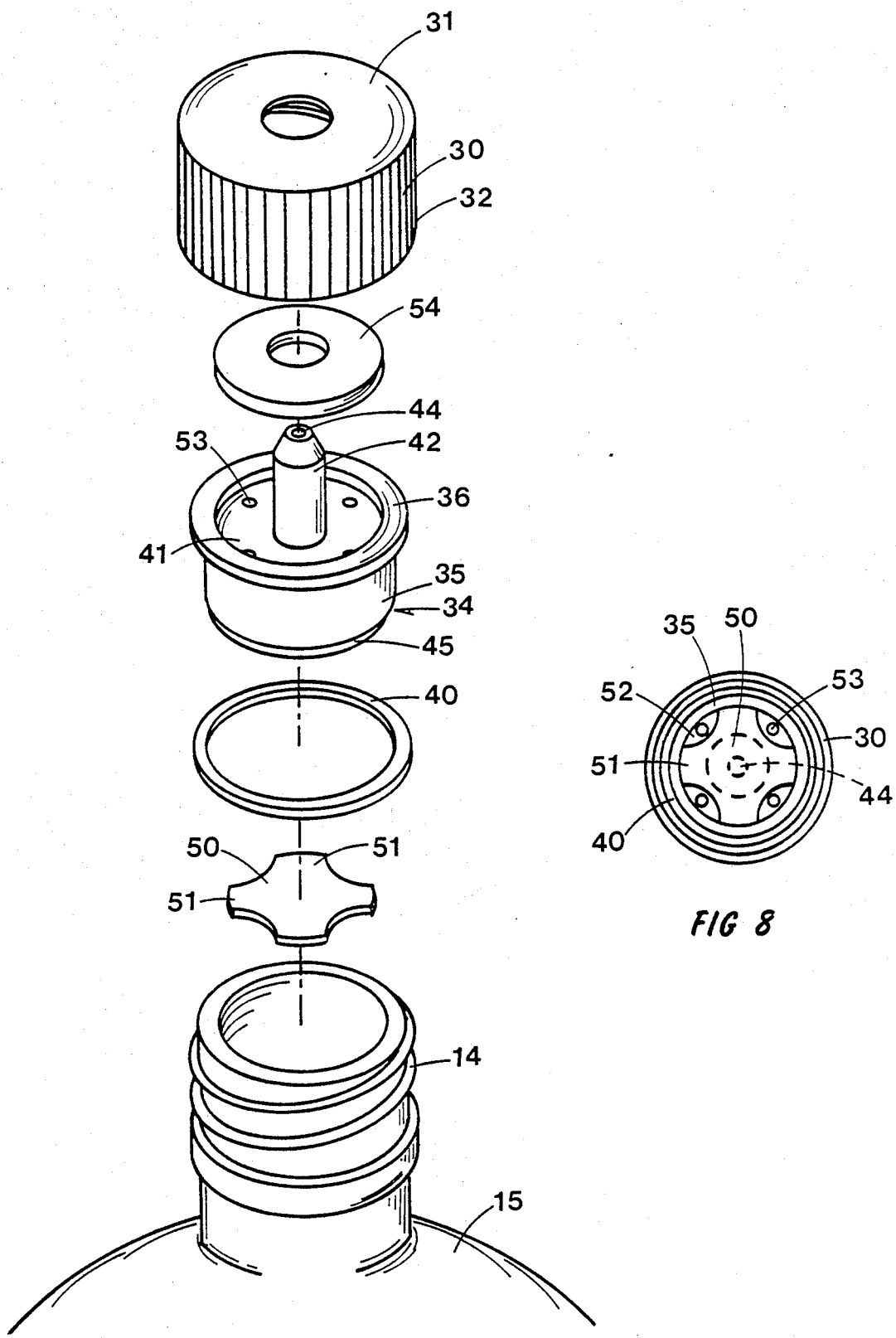
FIG. 7 is a fully exploded view of the carbonation cap shown in FIG. 5.
FIG. 8 is an inverted plan view of the carbonation cap shown in FIG. 5.

Each of the three embodiments of the carbonation cap (broadly indicated at 10 in FIGS. 1-4; at 10A in FIGS. 5-7; and at 10B in FIGS. 8-10) is useful in the carbonation, maintenance of carbonating pressure, storage, transfer, and/or inlet of pressurized $CO_2$ into beverages while at all times completely isolating the beverage and its components from the atmosphere.

This desirable result is accomplished in all three of the illustrated embodiments by the use of resilient seals made from selected plastics and in different configurations to achieve the desired results. In most instances, the resilient seals cooperate with other components of the carbonation cap to function as a valve.

The specific plastic to be used for the resilient seals will vary depending on the properties needed to perform the desired function. The plastics having those properties are known to those skilled in plastics, and a description of the specific plastic to be used for each resilient seal is not considered necessary to an understanding of the invention.

The resilient seals described have been used with prototypes of the carbonation caps, and the said resilient seals have been found to be as reliable and efficient as the conventional spring and ball mechanisms used in conventional check valves and pressure relief valves. Use of the resilient seals is preferred because of their satisfactory performance and their economy, but it is to be understood that use of check valves and pressure relief valves other than the resilient seals is considered to be within the scope of the invention.

The first embodiment 10 is especially useful in the fermentation and carbonation of beer and sparkling wine.

The second embodiment 10A is useful in the transfer of pressurized carbonized dioxide for any carbonated beverage, such as soft drinks, beer, and sparkling wine. The second embodiment is also useful for receiving pressurized $CO_2$ without exposing it to the atmosphere, for relieving excess pressure, and for maintaining the carbonating pressure of the beverage after it is received.

The third embodiment 10B is useful with its check seal for receiving pressurized $CO_2$ without exposing it to the atmosphere and for maintaining the carbonating pressure of the beverage after it is received. The third embodiment 10B is also useful with its flow seal for the transfer of pressurized $CO_2$ without exposure of the $CO_2$ or liquid in the bottle to the atmosphere.

THE FIRST EMBODIMENT

Figure 1:
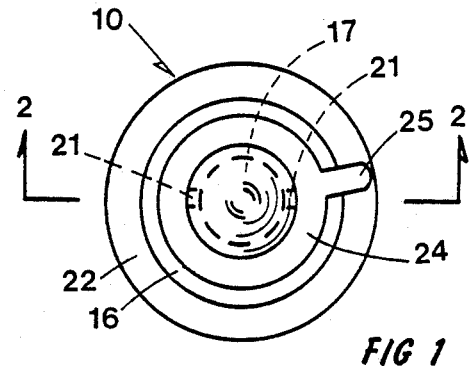
FIG. 1 is a top plan view of one embodiment of the carbonation cap of this invention.
Figure 2:
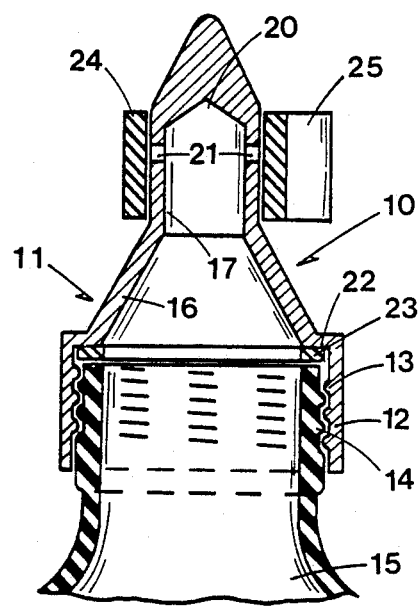
FIG. 2 is a sectional view taken substantially along the line 2—2 in FIG. 1.
Figure 3:
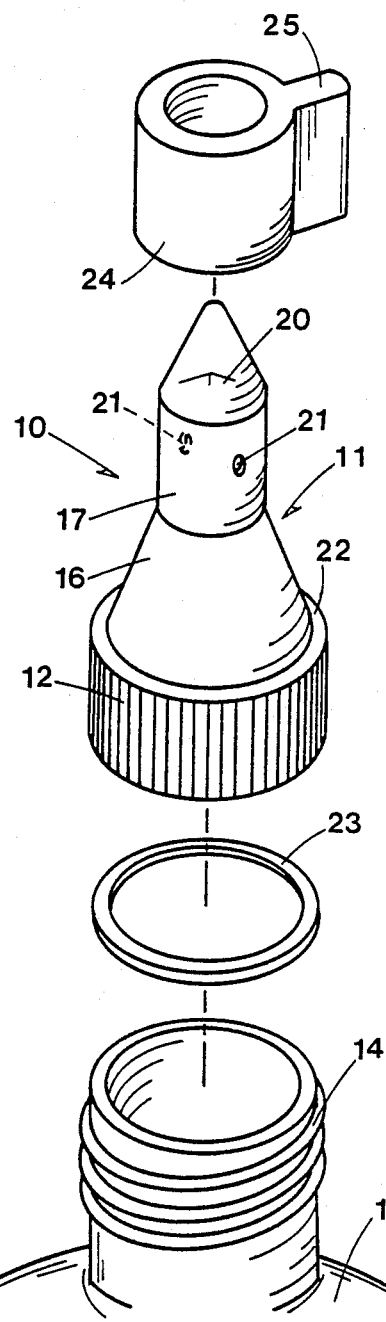
FIG. 3 is an exploded view of the carbonation cap shown in FIG. 1, illustrating the assembly of its components on a bottle.

Referring to the embodiment of FIGS. 1-4, the carbonation cap 10 comprises a hollow funnel-shaped housing 11 which is inverted when in the position of FIGS. 2 and 3. The larger end 12 is internally threaded as at 13 to register with the externally threaded neck 14 on a conventional screw top bottle 15.

The hollow housing 11 tapers inwardly as at 16 from the large end portion 12 to a reduced tubular portion 17 and terminates at a closed end 20 remote from the large end portion 12. Outlets in the form of bores or passageways 21 extend through the reduced tubular portion 17 and provide communication between the interior of the housing 11 and the surrounding atmosphere.

A shoulder 22 is defined at the juncture of the large end portion 12 with the inwardly tapered wall 16. The inside of shoulder 22 registers with a washer or O-ring 23 positioned between the shoulder 22 and neck 14 to provide an airtight seal when the cap 10 is assembled on the bottle 15.

The outlets 21 are normally closed by a resilient tubular seal 24 which tightly encircles the reduced tubular portion 17 and functions as a pressure relief valve to close the outlets until the pressure within the bottle 15 rises to a predetermined point. The resilient tubular seal 24 then allows excess pressure to escape through the outlets 21. A tab 25 extends from the resilient seal 24 to be manually grasped for pulling the resilient seal away from the outlets 21 to reduce the pressure within the bottle 15 when desired.

In operation, a supply of reagents and water for the production of beer is placed in the bottle 15 and the cap 10 is assembled to the neck of the bottle. Fermentation and carbonation is allowed to proceed in the usual manner.

Figure 4:
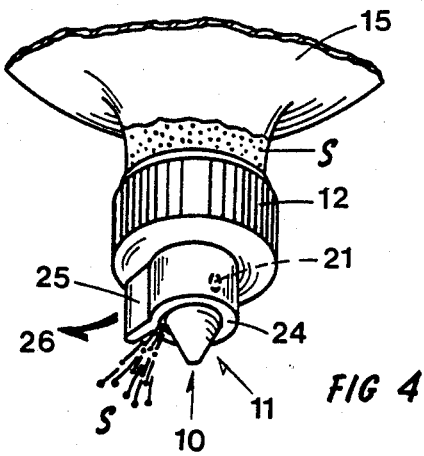
FIG. 4 is a view of the carbonation cap shown in FIG. 1 assembled on a bottle and positioned for accumulation and disposal of the sediment created during fermentation and carbonation of beer.

When fermentation is completed and the contents of the bottle are fully carbonated, the bottle 15 is inverted to the position of FIG. 4 and allowed to remain in that position for several hours, such as overnight, to allow the yeast sediment to collect in the funnel-shaped housing 11.

After the sediment has collected in the housing 11 and while the bottle is in the inverted position of FIG. 4, the tab 25 is manually grasped and pulled in the direction of the arrow 26 in FIG. 4. This pulls the resilient seal 24 away from at least one of the outlets and allows the sediment, indicated at S in FIG. 4, to be purged from the beer and removed from the bottle. The bottle is then positioned for storage with the resilient seal 24 again functioning as a pressure relief valve by allowing pressure to build up to a predetermined point and then moving away from the outlets 21 to allow the escape of excess pressure.

THE SECOND EMBODIMENT

Referring now to the embodiment of FIGS. 5-8, the carbonation cap 10A comprises a housing 30 having a top wall 31 and an external annular skirt 32 depending from the top wall. The external skirt 32 is internally threaded as at 33 to register with the externally threaded neck 14 of bottle 15.

A valve body, broadly indicated at 34, is positioned within the housing 30 to extend into and cover the neck of the bottle when assembled. The valve body includes an internal skirt 35 having an outer diameter correspondingly smaller than the inner diameter of the neck 14 to fit snugly in the neck of a selected bottle when assembled. An annular shoulder 36 defines the upper edge of the skirt and extends over the upper edge 37 of the neck 14 in FIGS. 6 and 7. A resilient washer or O-ring 40 provides an air tight seal to enclose the bottle from the atmosphere when the cap 10A is threadably attached to the bottle.

The outer diameter of the skirt 35 is selected to fit within the necks of only selected bottles, such as certain plastic bottles, known to have the strength to withstand carbonating pressure, and deliberately does not fit within the necks of bottles which may not have the requisite strength, such as certain glass bottles.

A wall 41 is positioned in the skirt 35 to extend across the interior of the neck 14. A nipple 42 extends axially from the wall and loosely through an opening 43 in the top wall 31 of the housing 30. The nipple has an inlet opening 44 which extends through the wall 41 for communication with the interior of the bottle.

A liquid to be carbonated is placed in the bottle 15 before the cap 10A is attached, and pressurized carbonized dioxide is introduced into the bottle through the passage way 44 in the nipple 42.

A resilient seal 50 covers the inner end of the passageway 44 and functions as a check valve to allow the entry of pressurized $CO_2$ but to prevent its escape through the passageway 44. The seal 50 is star shaped, including four radially extending legs 51 (FIGS. 7 and 8) which define air spaces 52 between them and expose outlet openings 53 in the wall 41 for communication with the interior of the bottle 15. The legs of the seal 50 overlie an inturned lower edge 45 of the skirt 35 to support the seal 50 in operative position.

The outlet openings 53 are covered by a resilient washer or seal 54 on top of the wall 41 between the nipple 42 and the annular flange 36. The resilient seal 54 functions as a pressure relief valve to permit the escape from the bottle of a predetermined amount of pressure, which escapes to the atmosphere around the nipple 42 through the opening 43 in the top wall 31 of the housing.

Carbonation cap 10A permits the consistent, regulated carbonation of any liquid contained within bottle 15 from an exterior source of pressurized carbon dioxide.

THE THIRD EMBODIMENT

Carbonation cap 10B may be used to receive pressurized carbonized dioxide and maintain a predetermined pressure of carbon dioxide in a bottle or to transfer pressurized $CO_2$ or liquid to or from a bottle, depending on the use of either a check seal or a flow seal.

Cap 10B uses the housing 30 of the second embodiment with its top wall 31, central opening 43, and depending annular skirt 32 internally threaded as at 33 to register with the externally threaded neck 14 of bottle 15.

A nipple 60 extends from its circular base 61 through the opening 43 in the top wall of the housing and is provided with a passageway 62 providing communication with the interior of the bottle. The base 61 extends over the upper edge of the bottle in the embodiment of FIG. 10 but is spaced therefrom by either a resilient seal 63 as in FIG. 10 or a flow seal 65 shown in FIG. 11.

The seal 63 is coextensive with the base 61 and provides an air tight attachment of the housing 30 with the bottle 15 to prevent the escape of pressurized carbonized dioxide from the bottle. Seal 63 has two small normally closed slits 64 spaced radially from the center of the seal. The slits 64 enable the seal 63 to function as a check seal to permit the entry of pressurized carbonized dioxide but block its escape.

The pressure of carbon dioxide from an external source through the passageway 62 in the nipple 60 moves the resilient seal 63 inwardly away from the base 61 as shown in FIG. 10, and the flexibility of the seal 63 allows the pressure of the carbon dioxide to open the slits 64 and admit carbon dioxide into the bottle 15. When the pressure in the bottle reaches or exceeds the pressure in the passageway 62, the resilient seal 63 is moved against the base 61 and the slits close to prevent the escape of pressure.

The check seal 63 may be replaced by the flow seal 65 when it is desired to transfer pressurized $CO^2$ or liquid to or from the bottle 15. The flow seal 65 is the same size as the check seal 63 but has a central opening 66 aligned with the passageway 62 in the nipple 60 through which liquid may freely flow.

SUMMARY

There is thus provided a carbonation cap which, in its several embodiments enables the carbonation and storage of carbonated beverages without at any time exposing the beverage or its components to the deleterious effects of the oxygen in the atmosphere.

Each of the embodiments includes inexpensive resilient seals which function as pressure relief valves and check valves at appropriate areas to achieve desired levels of carbonation in a beverage and to maintain that level of carbonation without at any time exposing the beverage or its components to the atmosphere from the beginning of carbonation to the time the beverage is poured from the bottle for consumption.

Although specific terms have been used in describing the invention, they have been used in a generic and descriptive sense only and not for the purpose of limitation.

I claim:

1. In combination with a screw top bottle, a carbonation cap for use during the collection and storage of a predetermined pressure of carbon dioxide gas in the bottle, said cap including:
   (a) an internally threaded housing for attachment to the bottle,
   (b) at least one radially extending outlet in the housing,
   (c) a resilient tubular seal normally extending across the outlet for preventing leakage of carbon dioxide gas below said predetermined pressure from the bottle to the atmosphere, and
   (d) means for preventing entry of atmospheric gases into the bottle.

2. In combination with a screw top bottle, a carbonation cap for use during the collection and storage of a predetermined pressure of carbon dioxide gas in the bottle, said cap including:
   (a) an internally threaded housing for attachment to the bottle,
   (b) at least one radially extending outlet in the housing,
   (c) a pressure relief valve for preventing leakage of carbon dioxide gas below said predetermined pressure from the bottle to the atmosphere, and
   (d) an O-ring between the housing and the bottle for preventing entry of atmospheric gases into the bottle.

3. A carbonation cap for use on a conventional screw top bottle during the fermentation, carbonation and storage of beer or sparkling wine, said cap comprising:
   (a) a housing including:
      (i) a small end and a large end in the shape of a funnel,
      (ii) an internally threaded portion extending from the large end of the funnel and corresponding in size to the neck of the conventional screw top bottle for threadable engagement therewith,
      (iii) at least one opening providing communication between the atmosphere and the small end of the said inner configuration of the housing; and
   (b) means normally closing said opening.

4. A carbonation cap according to claim 3 wherein said housing tapers inwardly from its said internally threaded portion and terminates in a reduced tubular portion at its end remote from the said internally threaded portion, said opening extending radially through said reduced tubular portion, and said means normally closing said opening comprising a resilient tubular seal tightly encircling the said reduced tubular end portion and overlying said opening.

5. A carbonation cap according to claim 4 wherein a tab extends from said resilient tubular seal, whereby the tab may be manually grasped to pull the tubular seal away from the opening to provide communication between the interior of said bottle and the atmosphere.

* * * * *